United States Patent

Reinhardt et al.

[11] 4,053,553
[45] Oct. 11, 1977

[54] METHOD FOR SELECTIVE RECOVERY OF CADMIUM FROM CADMIUM-BEARING WASTE

[75] Inventors: Hans Reinhardt, Vastra Frolunda; Harald Daniel Ottertun, Molndal; Jan Helge Arnold Rydberg, Vastra Frolunda, all of Sweden

[73] Assignee: Nife Jungner AB, Oskarshamn, Sweden

[21] Appl. No.: 648,999

[22] Filed: Jan. 14, 1976

[30] Foreign Application Priority Data

Jan. 28, 1975 Sweden .............................. 7500877

[51] Int. Cl.$^2$ .................... C01G 11/00; C01G 51/04; C01G 53/10
[52] U.S. Cl. .................... 423/105; 423/109; 423/139; 423/144; 423/150
[58] Field of Search ............... 423/109, 105, 139, 32, 423/150, 33, 144; 75/103, 119, 121

[56] References Cited

U.S. PATENT DOCUMENTS

| | | | |
|---|---|---|---|
| 1,780,323 | 11/1930 | Waring | 75/103 |
| 2,531,336 | 11/1950 | Hills et al. | 423/144 |
| 2,912,305 | 11/1959 | Wagner | 423/32 |
| 3,276,863 | 10/1966 | Drobnick | 423/139 |
| 3,743,585 | 7/1973 | Lowenhaupt et al. | 423/139 |
| 3,981,968 | 9/1976 | Miller | 75/101 BE |

OTHER PUBLICATIONS

Chemical Abstracts, vol. 53 (1959) No. 21,380g.

*Primary Examiner*—O. R. Vertiz
*Assistant Examiner*—Brian E. Hearn
*Attorney, Agent, or Firm*—Sughrue, Rothwell, Mion, Zinn and Macpeak

[57] ABSTRACT

A method for the selective recovery of cadmium, nickel and cobalt from a nickel-cadmium battery waste which comprises:
A. Leaching the waste with an ammoniacal carbonate solution to form an aqueous ammoniacal carbonate solution containing cadmium, nickel and cobalt (II) ammine complexes and a leaching residue. Any iron in the waste is in the leaching residue.
B. Adding air to the aqueous ammoniacal carbonate solution to oxidize the cobalt (II) ammine complex to cobalt (III) ammine complex.
C. Contacting the resulting aqueous ammoniacal carbonate solution with a substantially water insoluble organic solution which contains a hydroxyoxime which forms a nickel compound readily soluble in the organic solution with any nickel present but which does not affect cadmium and cobalt (III). Nickel is thereby removed.
D. Precipitating the cadmium as a carbonate by removing ammonia from the aqueous ammoniacal carbonate solution and then removing the cadmium in the form of a carbonate.
E. Withdrawing a portion of the aqueous ammoniacal carbonate solution from the preceding step after precipitation of cadmium and precipitating the cobalt by removal of ammonia.
F. Returning the ammonia from the preceding step to the cadmium free solution in step (D) and replacing lost carbonate ions by adding carbon dioxide in gaseous form. The resulting solution can then be reused in step (A).
G. Stripping the nickel compound in step (C) by washing with an aqueous solution of sulphuric acid to strip the nickel as nickel sulfate. The organic solution stripped of nickel can thereafter be reused in step (C).

6 Claims, 3 Drawing Figures

METHOD FOR SELECTIVE RECOVERY OF CADMIUM FROM CADMIUM-BEARING WASTE

BACKGROUND OF THE INVENTION

1. Field of the Invention

This invention relates to a method for selective recovery of cadmium from cadmium-bearing waste.

2. Description of the Prior Art

Such cadmium-bearing waste occurs in the electrical battery industry as waste from the manufacture of alkaline nickel-cadmium batteries and from such scrap batteries. The waste contains mainly the metals cadmium, nickel and iron, but small quantities of other metals may also occur. The predominant part of the waste is present in solid form. The invention is, however, not limited to use for waste from the battery industry but may also be used in respect to cadmium bearing waste from other fields.

Cadmium has earlier been extracted from battery waste by separating the cadmium-bearing waste from that containing nickel, when this has been possible. The cadmium content has thereafter been recovered from the cadmium-bearing waste by distillation. This method, however, is costly and pollutes the environment.

Another method, especially for mixed scrap of cadmium-nickel type, has been leaching with acid and precipitation by electrolyses. This method, too, is costly and requires careful supervision.

A process has also been proposed by means of which the waste is first washed and treated pyrometallurgically, and thereafter dissolved in an ammonium nitrate solution without dissolving nickel and iron. Cadmium is then precipitated as cadmium carbonate by the introduction of gaseous $CO_2$ into the solution. The excess $CO_2$ is expelled from the leaching solution and small quantities of leached nickel are separated by liquid extraction before the leaching solution is reused for renewed leaching. The disadvantage of this method, apart from the costly furnace apparatus, is that only about 94% of the cadmium is leached out of the waste and that the iron and the main quantity of the valuable nickel are not separated from one another. The $CO_2$ gas expelled is also lost, which adds to the expense of the process.

SUMMARY OF THE INVENTION

The method according to this invention produces a selective separation of cadmium from iron and nickel by leaching the cadmium-bearing waste in an aqueous ammoniacal carbonate solution, after which the cadmium is separated by liquid extraction of the remaining leached metals and precipitation of cadmium in the form of the carbonate by expulsion of ammonia from the solution.

The method according to the invention also includes preferentially that, after the precipitation of the cadmium, the solution is reused for leaching of the waste and thus, together with a leaching operation, a liquid extraction operation and a precipitation operation, forms a closed liquid system.

BRIEF DESCRIPTION OF THE ACCOMPANYING DRAWINGS

DETAILED DESCRIPTION OF THE INVENTION

Figure 1:
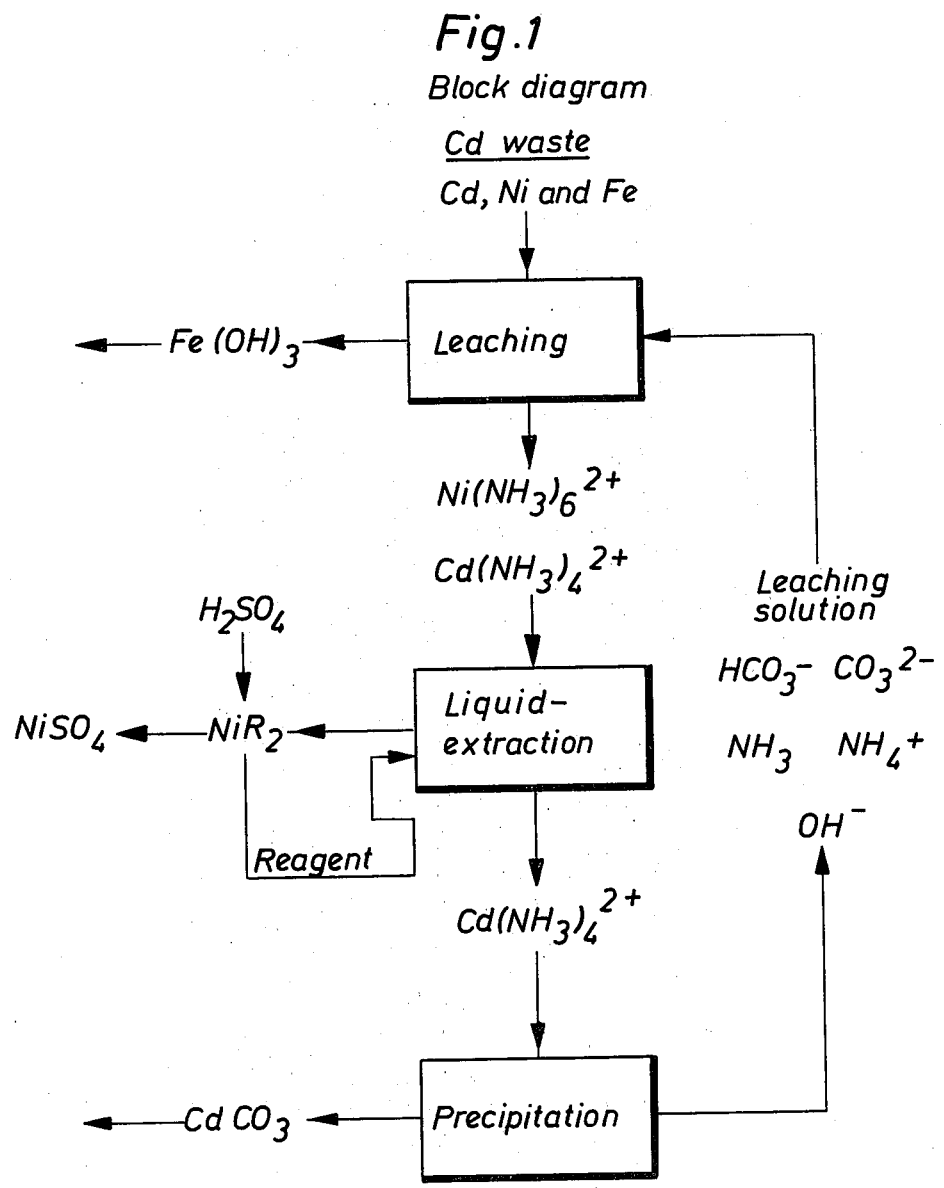
FIG. 1 shows a block diagram of the process.

The leaching is done according to the invention with an aqueous solution containing ammonia, ammonium ions, hydrogen carbonate ions and carbonate ions. The contents of these can be regulated by addition of ammonia and carbon dioxide. The sum of ammonia and ammonium ions in the solution should lie within the limits 1 to 10 molar, and for leaching of > 98% Ni and Cd preferentially within the limits 4.5 to 7.5 molar. The sum of the hydrogen carbonate ions and the carbonate ions in the solution should lie within the limits 0.2 to 5 molar, and for leaching of > 98% Ni and Cd preferentially 1.5 to 3.5 molar.

Especially in the leaching of battery scrap, which contains mainly cadmium, nickel and iron, the ammoniacal carbonate solution should preferably be so adjusted that cadmium, and any nickel in the scrap, enter into solution, whereas any iron in the scrap remains in an undissolved leaching residue.

According to the invention cadmium is separated from nickel by means of a liquid extraction procedure. This is done by treating the aqueous ammoniacal carbonate solution, after the leaching of the waste, with an organic solution, practically insoluble in water, containing a reagent which, with nickel, produces a nickel compound readily soluble in the organic solution but does not affect cadmium in the aqueous solution. The reagent R, which for example is dissolved in kerosene, forms, for instance, with nickel a metal organic compound, $NiR_2$, which is readily soluble in the organic solution. A typical such reagent is one which forms chelates, such as a hydroxyoxime or a hydroxyquinoline.

Precipitation of cadmium from the aqueous solution liberated from nickel in the leaching is done preferentially by thermal expulsion of ammonia from the aqueous solution and is carried out according to the invention preferentially by introduction of hot water vapor into a collecting vessel for the cadmium-bearing ammoniacal carbonate solution.

To ensure a satisfactory process economy it is advisable that the expelled ammonia is returned to the ammoniacal carbonate solution that has been freed from cadmium and that the carbonate ion loss in the precipitation is replaced by addition of carbon dioxide in gaseous form, after which the solution is reused for leaching.

The readily soluble nickel compound in the organic solution is split by washing the organic solution with an aqueous solution of sulphuric acid, nickel being stripped to the aqueous solution as nickel sulphate. The aqueous solution of sulphuric acid may contain 10–800 g/l free sulphuric acid and should preferentially contain 200 g/l free sulphuric acid.

The method according to the invention will be sequentially explained with reference to the attached diagrams.

From the block diagram in FIG. 1 it will be seen that, in a leaching operation with an ammoniacal carbonate solution, iron forms a practically insoluble iron hydroxide, $Fe(OH)_3$, while cadmium and nickel enter into solution by forming soluble cadmium and nickel amine complexes, $Cd(NH_3)_4^{2+}$ and $Ni(NH_3)_6^{2+}$.

The diagram also shows that, in a liquid extraction operation with an organic solution containing an organic reagent R, dissolved in kerosene, nickel forms with the reagent a metal organic compound, $NiR_2$, which is readily soluble in the kerosene and can therefore be removed from the leaching solution and thereafter be washed out with the sulphuric acid solution in the form of nickel sulphate.

It is also shown that, by expulsion of ammonia from the leaching solution in a precipitation operation, cadmium forms practically insoluble cadmium carbonate, $CdCO_3$, and can thereafter be recovered in pure form, while the leaching solution with addition of the expelled ammonia is returned to the leaching operation for renewed leaching.

Figure 2:
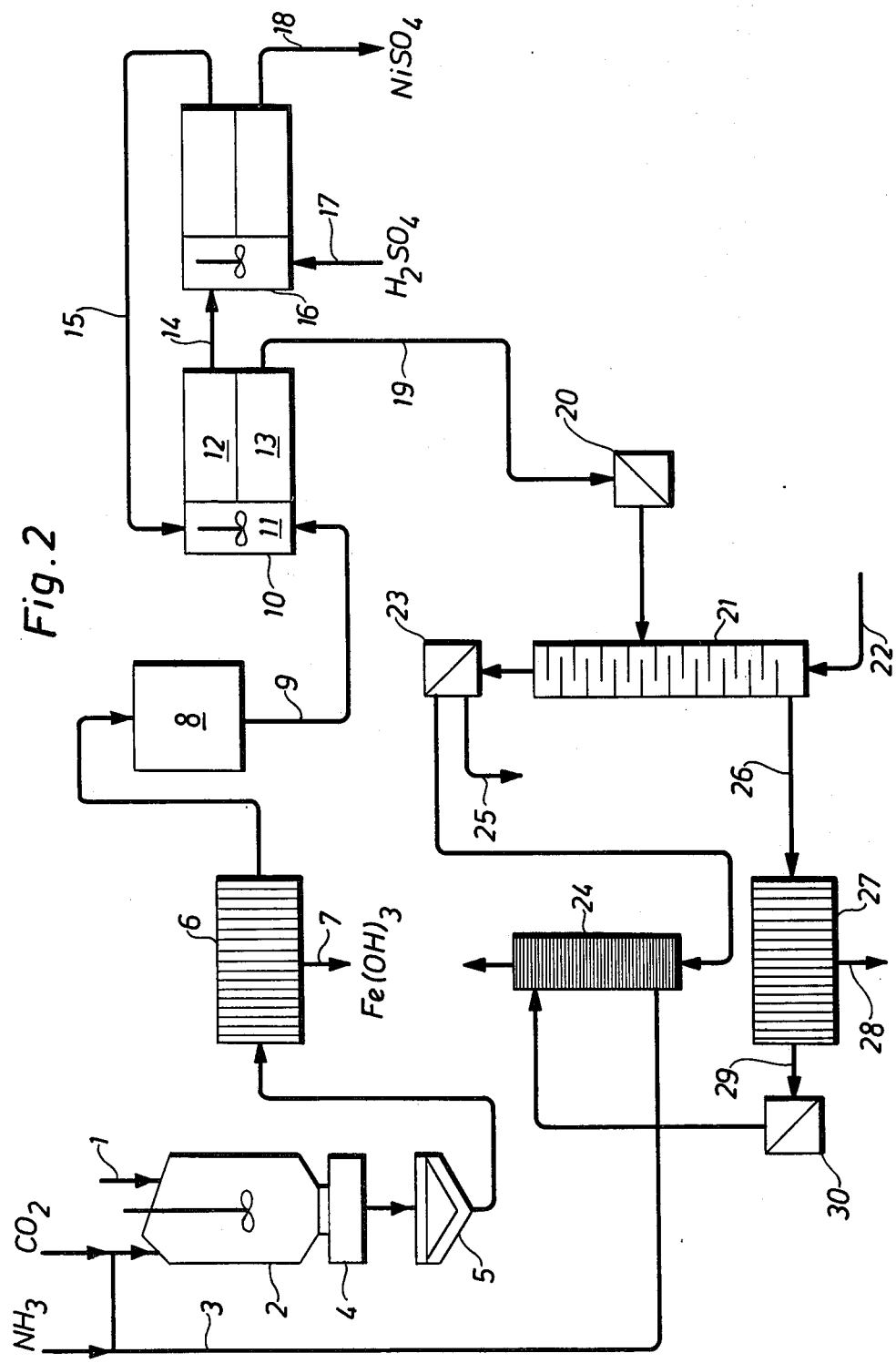
FIG. 2 shows schematically a plant for implementation of the method according to the invention.

The cadmium-bearing waste 1 in FIG. 2 is leached in a leaching vessel 2 containing an ammoniacal carbonate solution 3, the composition of which is regulated by addition of $NH_3$ and $CO_2$. Fragmentation of the material is done preferentially below the surface of the liquid in an appropriate crushing or grinding device 4, so avoiding exposure to the air. Prewashing with water to eliminate accumulation of potassium hydrate may be adopted if desired.

The need for such a processing stage depends on the quantity of potassium hydrate in the leaching material in relation to the content of nickel and cadmium.

In the leaching operation nickel and cadmium are obtained in the solution, while iron remains in the leaching residue. Under optimal conditions yields of > 95% for nickel and > 99% for cadmium are obtained.

The leaching vessel 2 is connected to a screen 5 in which the larger particles in the leaching residue are separated, and thereafter to a filtering press 6. The filtered residue 7, consisting chiefly of iron hydroxide, is washed with fresh leaching solution.

The leaching solution passes via a buffer tank 8 and a pipe 9 to the liquid extraction operation of the process where, in an extraction unit 10, nickel is extracted selectively to an organic solution containing the reagent LIX 64N or Kelex 120 dissolved in a diluent. LIX 64N is the trade name of a chelate former sold by General Mills Chemicals Inc., USA, and likewise Kelex 120, sold by Ashland Chemicals Inc., USA. For further details concerning these reagents reference should be made to Flett: Kemisk Tidskrift, 1973, pp. 56–58 .

Each stage in the extraction unit is of mixer-settler type and comprises a mixing chamber 11, in which the leaching solution is mixed with the organic solution, and a separation chamber 12, 13 in which the two liquid phases, which must be essentially insoluble in one another, separate owing to their different densities. The lighter phase, generally the organic solution, collects in the upper portion 12, and the heavier phase in the lower portion 13. An extraction unit consists of one or more mixer-settler stages. If multistage extraction is used, it is done in counterflow.

Figure 3:
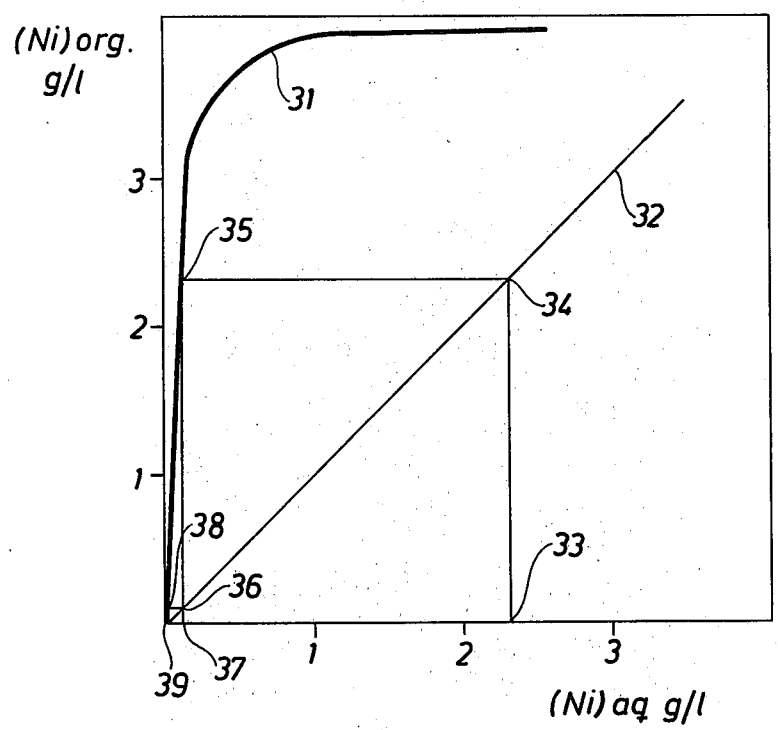
FIG. 3 is a McCabe-Thiele diagram for the extraction of nickel.

The number of stages required can be read from the McCabe-Thiele diagram in FIG. 3, the abscissa representing the content of nickel in the organic solution in equilibrium with the corresponding nickel content in the leaching solution. In FIG. 3 the contents are expressed in grams of nickel per liter leaching solution. Line 31 is the equilibrium curve. Line 32 is a working line, the slope of which is dependent on the ratio H/L, i.e., the ratio between the flow of the heavier phase, the leaching solution, and the flow of the lighter phase, the organic solution. In FIG. 3, H/L = 1. The nickel content in the incoming leaching solution is represented by the point 33 in FIG. 3. One draws the lines 33–34, vertical, 34–35, horizontal, 35–36, vertical, and its extension 37. The point 37 then represents the nickel content in the outgoing leaching solution after the first extraction stage. In the same way the nickel content after two extraction stages is obtained by means of the lines 36–38, horizontal, and 38–39, vertical.

The extraction unit 10 in FIG. 2 is connected by pipes 14, 15 with a stripping unit 16, each stage of which is a mixer-settler of the same type as in the extraction unit. The stripping unit as well may consist of one or more stages. In the stripping unit 16 the organic solution 14 from the extraction unit 10 is mixed with a sulphuric acid solution 17 containing 10–800 g/l free sulphuric acid, preferentially about 200 g/l free sulphuric acid. Under the influence of the sulphuric acid in the metal organic compound, $NiR_2$, is split in the organic solution and, therefore, Ni is transferred to the sulphuric acid solution. The flow of the sulphuric acid solution should preferably be adjusted so that the solution leaving the separation chamber through pipe 18 is a strong nickel-sulphate solution. The organic solution freed from nickel circulates through pipe 15 to the extraction unit 10 for renewed mixing with the leaching solution and thus for extraction of nickel. Centrifuges can be used in place of all settlers in the plant. The leaching solution from the extraction unit 10, which now contains cadmium as the only metal, passes through a pipe 19, on to a processing stage for precipitation of $CdCO_3$. The leaching solution should preferably be heated in a heat exchanger 20. The precipitation is accomplished in an ammonia separator 21 by thermal expulsion of $NH_3$ with water vapor 22. The expelled ammonia is taken to a condenser 23. The condensate contains predominantly $NH_3$ but also some $CO_2$ and is recirculated via an absorption tower 24. The treatment of the condensate depends on the total water balance in the process, so that it may be necessary to tap off part of the condensate through a pipe 25.

The cadmium-carbonate-bearing solution from the ammonia separator 21 is led through pipe 26 to a filter 27, in which $CdCO_3$ is filtered out. After filtration for separation of the precipitation product 28 the filtrate 29 is cooled in a heat exchanger 30 and is recirculated through the absorption tower 24 for $NH_3$ to the leaching operation.

The processing arrangement described above yields the best degree of purity of recovered cadmium. The precipitation of cadmium from the leaching solution can, however, also be done before the liquid extraction, yielding a higher degree of purity of recovered nickel.

The various phases of the method according to the invention will now be described in greater detail.

As regards the leaching, the following should be noted. Waste from, for example, nickel-cadmium batteries, which is exposed to air after comminution has proved to undergo an ageing process, which may impair the leaching yield of nickel. The mechanism underlying this effect is not altogether clear but may be due to passivity of particles of $Ni(OH)_2$ formed. The ageing process may, however, be disregarded in a process operating in practice if the comminution takes place below a liquid surface.

Leaching experiments have been carried out with removal of the sample at different times in order to follow the leaching process. In these experiments no difference of yield was noticeable after 7–8 and after 24 hours. A longtime experiment showed constant leaching even after 23 days. Raising of the temperature of the leaching operation does not appear to improve the result appreciably.

The chief variables of significance in the leaching system adopted are therefore the total contents of $NH_3$ and $CO_2$. These two total contents, which are regulated by addition of $NH_3$ gas and $CO_2$ gas, determine in turn the contents of $NH_4^+$, $OH^-$(pH), $HCO_3^-$ and $CO_3^{2-}$. the nickel and cadmium contents in the leaching residue.

The volume of the leaching solution used in the experiments was kept large, about 500 ml, in relation to the quantity of leaching material, in most cases 1.5 g of positive and 0.5 g of negative material. The contents tabulated were obtained after 24 hours of leaching.

Table 1.

| Experiments No | Leaching of Cd and Ni from battery scrap. | | | | | |
|---|---|---|---|---|---|---|
| | $[NH_3] + [NH_4^+]$ M | $[HCO_3^-] + [CO_3^{2-}]$ M | [Ni] g/l | [Cd] g/l | % leaching Ni | Cd |
| 1 | 1.0 | — | 0.07 | 0.04 | 12 | 49*) |
| 2 | 2.0 | — | 0.19 | 0.36 | 27.8 | 72.3 |
| 3 | 4.0 | — | 0.53 | 0.07 | 77.9 | 90*) |
| 4 | 8.0 | — | 0.56 | 0.09 | 85.9 | 87*) |
| 5 | 2.2 | 0.2 | 0.60 | 0.56 | 74.8 | 98.1 |
| 6 | 2.6 | 1.6 | 0.59 | 0.08 | 97.2 | 88*) |
| 7 | 3.5 | 1.5 | 0.57 | 0.57 | 86.0 | 98.8 |
| 8 | 4.8 | 1.5 | 0.88 | 0.48 | 98.4 | 98.8 |
| 9 | 5.6 | 1.6 | 0.55 | 0.10 | 97.7 | 85*) |
| 10 | 9.6 | 1.6 | 0.63 | 0.09 | 95.6 | 84*) |
| 11 | 4.0 | 2.0 | 0.44 | 0.57 | 92.4 | 98.8 |
| 12 | 5.4 | 2.0 | 0.87 | 0.45 | 98.0 | 98.3 |
| 13 | 4.5 | 2.5 | 0.67 | 0.59 | 96.3 | 95.6 |
| 14 | 5.8 | 2.5 | 0.92 | 0.44 | 99.4 | 99.1 |
| 15 | 6.2 | 3.0 | 0.86 | 0.46 | 98.9 | 98.9 |
| 16 | 5.2 | 3.2 | 0.66 | 0.53 | 96.5 | 97.6 |
| 17 | 6.7 | 3.5 | 0.86 | 0.46 | 99.0 | 98.9 |
| 18 | 7.5 | 3.4 | 1.00 | 0.28 | 99.3 | 99.3 |

*)These experiments were made on leaching material with low Cd content and consequently with impaired accuracy of data for Cd.

An increase of the free content of $NH_3$ increases the total "leaching potential" of the system in respect to nickel and cadmium through an increased tendency to formation of $Ni(NH_3)_6^{2+}$ and $Cd(NH_3)_4^{2+}$. An increase of the $CO_3^{2-}$ content, on the other hand, operates in the reverse direction through an increased tendency to formation of practically insoluble $CdCO_3$, but also of $NiCO_3$ The presence of $NH_4^+$, $HCO_3^-$ and $CO_3^{2-}$ ions, moreover, gives the necessary buffering effect.

In the cadmium precipitation stage the presence of the carbonate system provides a means of regulating the conditions so as to form $CdCO_3$. This is done by thermal expulsion of $NH_3$, whereby precipitation can take place. The latter implies that the optimal conditions for the leaching cannot be judged independently of the corresponding conditions for precipitation. Too high a content of free $NH_3$ implies worse conditions for precipitation, and the losses of $NH_3$ may be expected to be generally greater.

Table 1 shows the leaching yields for nickel and cadmium as function of the total content of ammonia, ($NH_3 + NH_4^+$), at different total carbonate contents, ($HCO_3^- + CO_3^{2-}$). The leaching material consisted of positive and negative electrode paste deriving from nickel-cadmium batteries, scraped off cut-up electrodes. This procedure was repeated for every new leaching experiment in order to avoid air exposure of the paste. After the leaching with the ammonical carbonate solution the leaching residue was washed and then leached again with an aqua regalis solution for determination of To sum up, it may be stated that some leaching has occurred in the entire range between 1 molar and 10 molar content of $NH_3 + NH_4^+$ in the leaching solution and 0.2 to 5 molar content of $HCO_3^- + CO_3^{2-}$. For leaching of >98% nickel and cadmium the content of $NH_3 + NH_4^+$ should be > 4.5 M and for the interval 4.5 =− 7.5 M the content of $HCO_3^- + CO_3^{2-}$ should be in the range 1.5 −3.5 M. The optimal values cannot be stated more exactly since other process variables come into operation. These are primarily the following:

1. The capacity of the leaching solution in respect to the contents of the leached metals.
2. The composition of the leaching solution with regard to an optimal precipitation of $CdCO_3$.
3. Losses of $NH_3$ gas in the various stages of the process.

The capacity of the leaching solution in respect to the contents of the leached metals has a great significance for the dimensioning of the process and thus for its economy. This will be realized from the fact that the flow of leaching solution to the extraction stages is inversely proportional to the content of nickel and cadmium.

The result of two series of leaching experiments, carried out in order to discover the leaching capacity, is shown in table 2. The quantity of leaching material, with constant ratio of positive to negative material, was increased stepwise while keeping the volume of the leaching solution constant at 500 ml. The leaching time was 10 hours. The compositions of the leaching solutions were 2M $NH_3$ + 2.5 M $NH_4HCO_3$ and 3.9 M $NH_3$ + 2.5 M $NH_4HCO_3$.

Table 2.

| | Leaching of Cd and Ni from battery scrap. Capacity of the leaching solution. | | | | | | | |
|---|---|---|---|---|---|---|---|---|
| | Weight leaching | | $[NH_3]+[NH_4^+]$ | $[HCO_3^-]+[CO_3^{2-}]$ | | [Ni] | [Cd] | % leaching |
| No. | g(−) | g(+) | M | M | pH | g/l | g/l | Ni Cd |
| 1 | 0.51 | 1.52 | 4.5 | 2.5 | 9.21 | 0.51 | 0.41 | 94 81 |
| 2 | 2.01 | 6.00 | 4.5 | 2.5 | 9.19 | 3.54 | 0.78 | 96 42 |
| 3 | 2.51 | 7.56 | 4.5 | 2.5 | 9.18 | 4.40 | 0.88 | 95 37 |

Table 2.-continued

Leaching of Cd and Ni from battery scrap. Capacity of the leaching solution.

| No. | Weight leaching g(−) | Weight leaching g(+) | [NH$_3$]+[NH$_4^+$] M | [HCO$_3^-$]+[CO$_3^{2-}$] M | pH | [Ni] g/l | [Cd] g/l | % leaching Ni | % leaching Cd |
|---|---|---|---|---|---|---|---|---|---|
| 4 | 0.51 | 1.50 | 6.4 | 2.5 | 9.88 | 0.47 | 0.47 | 91 | 98 |
| 5 | 2.00 | 6.07 | 6.4 | 2.5 | 9.82 | 3.00 | 2.03 | 88 | 97 |
| 6 | 2.50 | 7.50 | 6.4 | 2.5 | 9.82 | 4.48 | 2.35 | 93 | 98 |

Experiments 1-3 show impaired yields of Cd with increased ratio between quantity of leaching material and volume of leaching solution. This is because the solubility product of CdCO$_3$ is exceeded, with impaired leaching of Cd in consequence. In experiments 4-6, on the other hand, the leaching of Cd is satisfactory. The impaired leaching of Ni in the experiments, compared with table 1, may be explained by the aforementioned ageing effect on exposure of the leaching material to air.

The liquid extraction will now be described in greater detail. Nickel can be extracted from ammoniacal solutions with organic reagents, e.g., LIX 64N or Kelex 120, dissolved in a diluent. Both of these reagents form chelates. LIX 64N is a mixture of two hydroxyoximes dissolved in a petroleum fraction, while Kelex 120 is a hydroxyquinoline dissolved in nonyl phenol. As diluent is used an aliphatic or aromatic hydrocarbon readily volatile at the working temperature, such as a petroleum fraction with a boiling point interval corresponding to that of kerosene and with a high flame point from the safety aspect.

Cadmium as well can be extracted, but its yield is considerably lower. Experimental results show that nickel can be extracted in a 2-3 stage counterflow process with very nearly 100% yield and very selective from cadmium.

On extraction of nickel from ammoniacal solutions with chelate formers there are contradictory hypotheses concerning the structure of the extracted metal complex. According to one hypothesis the metal in the metal organic complex coordinates NH$_3$ ligands, according to another this is not so.

It may now be considered to be fully established, however, that nickel is extracted as a pure Ni chelate complex without coordination of NH$_3$. A circumstance which supports this is the change of color which occurs when nickel is extracted. In the aqueous solution the Ni(NH$_3$)$_6^{2+}$ complex gives a blue to violet color, while the Ni complex in the organic phase is green-colored, as also is the Ni(H$_2$O)$_6^{2+}$ ion.

Extraction of nickel therefore takes place through the reaction

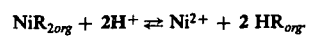

$$Ni(NH_3)_6^{2+} + 2\ HR_{org} \rightleftarrows NiR_{2\ org} + 2\ NH_4^+ + 4\ NH_3$$

The dependence on metal content, i.e., the equilibrium curve, has been investigated by means of shaking tests, in which the leaching solution was mixed with 20% LIX 64N in Nysolvin HF at varying phase-volume ratios. Nysolvin HF is the trade name of a kerosene fraction with a boiling point interval of 190°-250° C and is sold by Nynas Petroleum AB. The leaching solution had the composition 3M NH$_3$, 2.5M NH$_4$HCO$_3$, 2.33 g/l Ni and 1.30 g/l Cd The result will be seen from table 3. D$_{Me}$ (the distribution factor) is defined as Me$_{org}$/Me$_{aq}$.

Table 3

Equilibrium values for nickel extraction

| No. | V$_{org}$/V$_{aq}$ | [Ni]$_{aq}$ | [Ni]$_{org}$ | [Cd]$_{aq}$ | [Cd]$_{org}$ | D$_{Ni}$ | D$_{Cd}$ |
|---|---|---|---|---|---|---|---|
| 1 | 1:10 | 2.29 | 3.90 | 1.30 | — | 1.7 | — |
| 2 | 1:5 | 1.79 | 3.90 | 1.29 | — | 2.2 | — |
| 3 | 1:2 | 0.42 | 3.59 | 1.30 | — | 8.5 | — |
| 4 | 1:1 | 0.023 | 2.23 | 1.29 | — | 100 | — |
| 5 | 1:2 | 0.003 | 1.06 | 1.29 | 0.018 | > 10$^2$ | 0.014 |
| 6 | 1:5 | 0.003 | 0.48 | 1.14 | 0.035 | > 10$^2$ | 0.031 |
| 7 | 1:10 | 0.003 | 0.26 | 0.94 | 0.037 | > 10$^2$ | 0.039 |
| 8 | 1:20 | 0.003 | 0.13 | 0.74 | 0.029 | > 10$^2$ | 0.039 |

These data imply very favorable conditions for a high extraction yield and a very good selectivity in respect to nickel. See the McCabe-Thiele diagram (FIG. 3). With the leaching solution used in the test two theoretical equilibrium stages given an extraction yield of very nearly 100% for nickel. The extraction of cadmium is at the same time very low. It can be further reduced, moreover, since, the optimal flow conditions, a high nickel content in the organic solution will suppress cadmium. If necessary a scrubbing stage, with selective washing out of cadmium from the extract, can be adopted.

The washing out of nickel with H$_2$SO$_4$ solution is based on the reaction $$NiR_{2org} + 2H^+ \rightleftarrows Ni^{2+} + 2\ HR_{org}$$

The distribution factor is here determined by the hydrogen ion activity. An experiment in which an organic solution with nickel was mixed with 2 M H$_2$SO$_4$ shows that the distribution factor is D < 10$^{-3}$. The equilibrium content of nickel in the aqueous phase was then 19 g/l. This implies that the washing out does not require more than one theoretical equilibrium stage. The number of stages is, however, dependent on the permissible free acid content in the regenerated nickel solution, inasmuch as more stages are required if this content must be kept low.

To avoid transfer of ammonium ions by dissolved ammonia in the organic solution, and thus precipitation of nickel ammonium sulphate in the stripping stages, the organic solution from the extraction can either be subjected to an air blast or washed with an ammonium hydrogen carbonate solution under simultaneous injection of CO$_2$ before the stripping stages. The latter procedure is very effective and the washing solution can also be used in the leaching operation.

As has appeared earlier, according to the invention cadmium will be precipitated as CdCO$_3$ by expulsion of NH$_3$ with water vapor in an ammonia separator. The leaching solution should preferably be preheated in conjunction therewith, which facilitates the transport of NH$_3$ to the vapor phase. Some CO$_2$ may also be expelled when most of the free NH$_3$ is vaporized. How far the content of free NH$_3$ must be lowered is dependent on the solubility equilibrium:

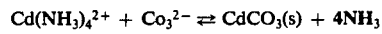

$$Cd(NH_3)_4^{2+} + Co_3^{2-} \rightleftarrows CdCO_3(s) + 4NH_3$$

In one series of experiments the solubility of $CdCO_3(s)$ precipitated from solutions of the composition concerned was measured. The result is presented in table 4.

Table 4.

| Test No. | Solubility data for $CdCO_3$ | | | |
|---|---|---|---|---|
| | $[NH_3] + [NH_4^+]$ M | $[HCO_3^-] + [CO_3^{2-}]$ M | pH | $[Cd]_{aq}$ g/l |
| 1 | 3.0 | 1.0 | 9.67 | 0.45 |
| 2 | 5.0 | 3.0 | 8.78 | 0.02 |
| 3 | 4.0 | 1.0 | 9.86 | 2.5 |
| 4 | 6.0 | 3.0 | 9.15 | 0.19 |
| 5 | 5.0 | 1.0 | 10.07 | 8.6 |
| 6 | 7.0 | 3.0 | 9.42 | 1.08 |

If the precipitation of cadmium is to be more complete, $NH_3$ must be expelled to lower contents than in table 4.

EXAMPLE

In a plant of the type illustrated in FIG. 2, waste products from manufacture of alkaline nickel-cadmium batteries and from such scrapped batteries are leached in a three-stage leaching equipment consisting of three leaching vessels 2 of 40 m³ each with an ammoniacal carbonate solution 3 containing 4.0 M $NH_3$ and 2.5 M $NH_4HCO_3$.

The waste is fragmented in the leaching solution with a mill 4. After filtration, first in a screening device 5 for metal strips and the like and then in a filtering press 6 for metal hydroxide, the leaching solution contains about 6 g/l Ni and about 5 g/l Cd. The yield from the leaching is about 98% for Ni and very nearly 100% for Cd. The content of Fe in the leaching solution is < 0.005 g/l.

The resulting leaching solution 9, about 55 l/min, is taken to a liquid extraction equipment 10 consisting of three mixer-settlers, mixing chamber 500 l and separation chamber 2.500 l, connected for counterflow extraction. The flow 15 of the organic solution is about 100 l/min and consists of 20 percent by volume LIX 64N in Nysolvin HF. In the extraction stages the nickel content of the leaching solution is reduced to > 0.015 g/l.

The organic solution 14, containing about 3.5 g/l Ni after the extraction, is treated in a stage with $NH_4HCO_3$ solution for removal of dissolved $NH_3$ and is washed in two stages with an aqueous solution 17 containing 200 free sulphuric acid. The mixer-settlers are of the same size as before. The flow of the sulphuric acid solution is about 5 l/min, which gives a nickel content in the sulphuric acid solution 18 of about 70 g/l.

The leaching solution freed from nickel is heated in a heat exchanger 20 and $NH_3$ is separated in an ammonia separator 21 by means of water vapor so that the content of $NH_3 + NH_4^+$ decreases from 6 M to about 4.5 M. $CdCO_3$ is thereby precipitated, but not $NiCO_3$. The $CdCO_3$ precipitate is filtered in a filtering press 27. The Cd content in the solution after filtering is < 0.025 g/l. The ammonia is condensed in a heat exchanger 23 and added to the low-cadmium solution from the filtering press in an absorption tower 24, after which this solution is recirculated to the leaching operation. Depending on the water balance in the process it may be necessary to tap off some low-$NH_3$ condensate. The $NH_3$ recovery, however, will be about 90%.

The presence of cobalt in the recovery process may affect the form of the process. The oxidation process $Co(II) \rightleftharpoons Co(III)$ in ammoniacal environment is of interest in this connection, since it determines whether cobalt will be extracted in the liquid extraction operation. The complex $Co(NH_3)_6^{3+}$ is considerably weaker than $Co(NH_3)_6^{3+}$, so that Co(II) can be extracted but not Co(III). If cobalt is extracted there is a risk that the metal accumulates in the organic solution, since it is not washed out with 2 M $H_2SO_4$.

In one experiment Co(II) was dissolved in 4 M $NH_3$ + 2.5 M $NH_4HCO_3$ to a content of 0.55 g/l. The solution was then agitated in a beaker at room temperature under shielding to avoid evaporation of $NH_3$. Samples were taken at given times. The content of Co(II) and Co(III) was determined by recording of the absorption spectra. The complex $Co(NH_3)_6^{2+}$ gives a brownish yellow color, $Co(NH_3)_6^{3+}$ a violet. The result is shown in table 5.

Table 5

| Time | Co(II) g/l | Co(III) g/l |
|---|---|---|
| 1.5 h | 0.38 | 0.090 |
| 2.5 h | 0.38 | 0.14 |
| 5 h | 0.17 | 0.35 |
| 48 h | 0.1 | 0.49 |

As appears from table 5, the reaction time is on the order of a couple of days. The process can, however, be accelerated by maintaining the oxygen content in the solution by addition of atmospheric oxygen. The presence of graphite catalyses the oxidation.

In the process, air is added to the leaching solution in the buffer tank 8 before the liquid extraction operation, whereby cobalt in the leaching solution is further oxidized to trivalent cobalt. This arrangement also causes oxidation of any leached $Fe^{2+}$ to $Fe^{3+}$, which then emerges as $Fe(OH)_3$. The buffer tank 8 should preferably be calculated for a retention time of about 60 hours. No cobalt accumulation then occurs in the process.

Cobalt can be recovered from a bleed solution at 29 in FIG. 2 withdrawn from the leaching solution cycle of the process after the precipitation of cadmium, in which case the tapping off through pipe 25 can be eliminated. The cobalt recovery takes place through continued expulsion of $NH_3$—$CO_2$, preferably at 90°-100° C and with a retention time of about 10 minutes. Cobalt then emerges as the hydroxide or carbonate. The precipitation stage for cobalt should preferably be dimensioned for 1 hour's retention time in order to obtain as quantitative an expulsion of $NH_3$ as possible. The expelled vapor phase with $H_2O$—$NH_3$—$CO_2$ is returned to the absorption tower 24 of the process for $NH_3$—$CO_2$ recovery.

What is claimed is:

1. A method for the selective recovery of cadmium, nickel and cobalt from a nickel-cadmium battery waste which comprises:
   a. leaching the waste with an ammoniacal carbonate solution wherein the sum of ammonia and ammonium ions ranges from 1 to 10 molar and the sum of hydrogen carbonate ions and carbonate ions ranges from 0.2 to 5 molar, thus forming an aqueous ammoniacal carbonate solution containing cadmium, nickel and cobalt(II) ammine complexes and a leaching residue, wherein any iron in the waste remains in the undissolved leaching residue;
   b. adding air to the aqueous ammoniacal carbonate solution from step (a) to thereby oxidize the cobalt (II) ammine complex to cobalt (III) ammine complex;

c. contacting the resulting aqueous ammoniacal carbonate solution with an organic solution substantially insoluble in water which contains a hydroxyoxime with which nickel forms a nickel compound readily soluble in the organic solution, but which does not affect cadmium and cobalt (III) in the aqueous ammoniacal carbonate solution to thereby remove nickel therefrom;

d. precipitating the cadmium in the form of a carbonate by removing ammonia from the aqueous ammoniacal carbonate solution and removing said cadmium in the form of a carbonate;

e. withdrawing a portion of the aqueous ammonicacal carbonate solution resulting from step (d) after the precipitation of cadmium as a carbonate and precipitating the cobalt from the thus withdrawn solution by the removal of ammonia therefrom;

f. returning the ammonia resulting from step (e) to the aqueous ammoniacal carbonate solution which has been freed from cadmium in step (d) and replacing the loss of carbonate ions due to any precipitations by the addition of carbon dioxide in gaseous form, whereafter the resulting aqueous ammoniacal carbonate solution is reused in the leaching of step (a);

g. stripping the nickel compound readily soluble in the organic solution generated in step (c) by washing the organic solution with an aqueous solution of sulphuric acid containing 10 - 800 g/l of free sulphruic acid, whereby the nickel is stripped into the aqueous solution in the form of nickel sulphate, and thereafter reusing the organic solution stripped of nickel in step (c).

2. The method according to claim 1 wherein the sum of ammonia and ammonium ions in the aqueous ammoniacal carbonate solution used in step (a) ranges from 4.5 to 7.5 molar.

3. The method according to claim 1 wherein the sum of hydrogen carbonate ions and carbonate ions in the aqueous ammoniacal carbonate solution used in step (a) ranges from 1.5 to 3.5 molar.

4. The method according to claim 1 wherein the removal of ammonia in step (e) takes place at a temperature of 90°-100° C.

5. The method according to claim 1 wherein the aqueous solution of sulphuric acid contains 200 g/l free sulphuric acid.

6. The method according to claim 1 wherein the organic solution comprises kerosene as a solvent.

* * * * *